R. McKENNA.

Improvement in Cotton-Gins.

No. 5,148. Reissued Nov. 19, 1872.

Witnesses
John A. Ellis
Wm K. Ellis

Inventor
Robt McKenna
Per
J. H. Alexander & Co
Attys.

UNITED STATES PATENT OFFICE

ROBERT McKENNA, OF WHITE'S STATION, TENNESSEE.

IMPROVEMENT IN COTTON-GINS.

Specification forming part of Letters Patent No. 108,500, dated October 18, 1870; reissue No. 5,148, dated November 19, 1872.

*To all whom it may concern:*

Be it known that I, ROBERT McKENNA, of White's Station, in the county of Shelby and State of Tennessee, have invented certain new and useful Improvements in Cotton-Gins; and I do hereby declare that the following is a full, clear, and exact description thereof, reference being had to the accompanying drawing and to the letters of reference marked thereon which form a part of this specification.

The nature of my invention consists, first, in the employment of a roller or shaft located horizontally and longitudinally in the roll-box, at the bottom of the roll, near the lower edge of the seed-board, said roller being provided with a series of flanges throughout its length at equal distance from each other, which distance corresponds to the spaces between the saws on the saw-cylinder; and second, in the adjustment and arrangement of the end sideboards of the roll-box in relation to the end saws on the saw-cylinder in such a manner as to make the length of the roll correspond to the length of the series of saws on the saw-cylinder.

In order to enable others skilled in the art to which my invention appertains to make and use the same, I will now proceed to describe its construction and operation, referring to the annexed drawing, in which—

Figure 2:
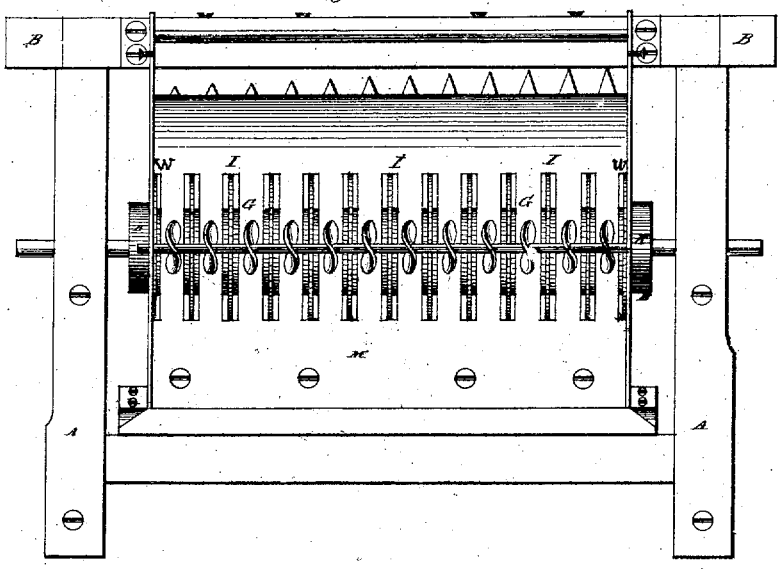
Figure 1:
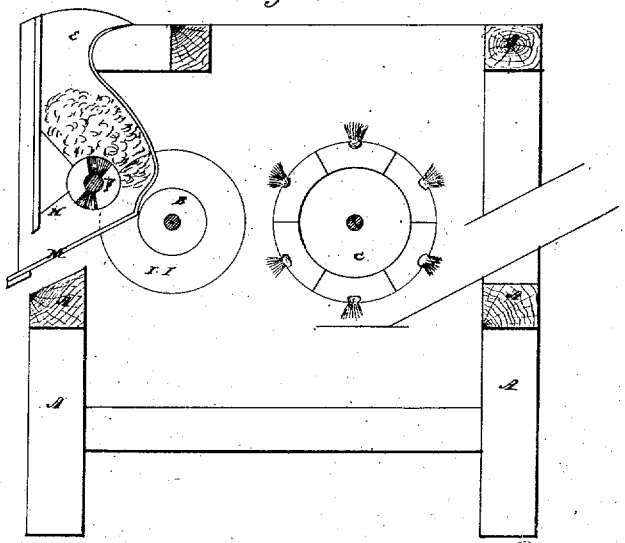

Figure 1 is a longitudinal vertical section of a cotton-gin embodying my invention, and Fig. 2 is a front elevation of the same with the seed-board removed.

A represents the frame of a cotton-gin with the saw-cylinder B, brush-cylinder C, and ribs M, all constructed, located, and operated in the usual manner. E represents the end sideboard of the roll-box. Lengthwise in the roll-box is located a horizontal shaft or roller, F, which may be of any desired diameter and of equal length with the roll. This shaft or roller is placed at the bottom of the roll near the lower edge of the seed-board H, and is provided with a series of flanges, G G, at equal distance from each other, which distance corresponds with the spaces between the saws I I on the cylinder B. The roller F is provided with journals, which are supported in bearings fastened to the end sideboards. On one end of the said roller is a pulley, K, and motion is communicated by means of a belt around said pulley from the saw-cylinder.

As the roller F revolves on its axis, the flanges G G in their revolutions mesh into the parts of the roll that pass between the saws, thereby expelling the seed from the roll and pressing the lint against the saws. As they revolve the flanges expel the seed from the roll-box, conveying the seed in their exit from contact with the saws, enabling the saws to detain and return to the roll any seed that has not been entirely freed from lint. By this means the roll is kept free from surplus seed, the lint is kept in contact with the saws, the seed is prevented from accumulating in the roll-box, and the escape of seed not properly freed from lint is prevented.

The end sideboards E of the roll-box are adjusted or arranged in relation to the end saws on the saw-cylinder B in such a manner as to prevent the roll from being more extended in length than the series of saws I I on the saw-cylinder. This is accomplished by dispensing with the rib, which is located between the end saw and end sideboard at each end of the series of ribs M, and locating the end sideboards E in such close proximity to the end saws as to prevent any part of the roll from getting between the end sideboards and the end saws. By this means the saws are enabled to operate on the roll throughout its entire length, thereby preventing the roll from breaking the ends.

Having thus fully described my invention, what I claim as new, and desire to secure by Letters Patent, is—

1. The roller or shaft F and flanges G G, when constructed and arranged in the hopper, as shown, and having a positive motion, substantially as and for the purpose set forth.

2. In combination with the above, the end saws W W and sideboards E, when constructed and arranged for operation without intervening ribs, substantially as and for the purpose herein specified.

In testimony that I claim the foregoing as my own I affix my signature in presence of two witnesses.

ROBERT McKENNA.

Witnesses:

E. T. STARKE,

MARTIN B. JONES.